(12) United States Patent  
Seuberling

(10) Patent No.: US 11,624,407 B2
(45) Date of Patent: Apr. 11, 2023

(54) ROLLING BEARING ASSEMBLY

(71) Applicant: AKTIEBOLAGET SKF, Gothenburg (SE)

(72) Inventor: Mathias Seuberling, Grosseibstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/480,652

(22) Filed: Sep. 21, 2021

(65) Prior Publication Data

US 2022/0128096 A1  Apr. 28, 2022

(30) Foreign Application Priority Data

Oct. 26, 2020  (DE) .......................... 102020128097.1

(51) Int. Cl.
| *F16C 19/52* | (2006.01) |
| *F16C 41/00* | (2006.01) |
| *F16C 19/38* | (2006.01) |
| *F16C 23/08* | (2006.01) |

(52) U.S. Cl.
CPC .......... *F16C 41/007* (2013.01); *F16C 19/383* (2013.01); *F16C 19/52* (2013.01); *F16C 23/086* (2013.01); *F16C 2233/00* (2013.01); *F16C 2300/14* (2013.01)

(58) Field of Classification Search
CPC ...... F16C 19/383; F16C 19/52; F16C 23/086; F16C 41/007; F16C 2233/00; F16C 2300/14; G01M 13/04
See application file for complete search history.

(56) References Cited

U.S. PATENT DOCUMENTS

| 4,092,053 A * | 5/1978 | Riegler .................. F16C 13/02 266/245 |
| 6,113,276 A | 9/2000 | Bourgeois-Jacquet |
| 6,119,504 A * | 9/2000 | Claus .................... F16C 19/52 116/208 |
| 6,161,962 A | 12/2000 | French et al. |
| 2016/0312835 A1 | 10/2016 | Nicolas et al. |

(Continued)

FOREIGN PATENT DOCUMENTS

| DE | 69724343 T2 | 6/2004 |
| DE | 69732183 T2 | 7/2009 |
| DE | 102016206734 A1 | 10/2016 |

(Continued)

OTHER PUBLICATIONS

Search Report from the Austrian Patent Office dated Jun. 3, 2022 in related application No. A 50655/2021.

(Continued)

*Primary Examiner* — Phillip A Johnson
(74) *Attorney, Agent, or Firm* — J-Tek Law PLLC; Scott T. Wakeman; Mark A. Ussai

(57) ABSTRACT

A rolling bearing assembly includes an inner ring supported by a shaft or formed by a surface of the shaft, an outer ring supported in a housing or formed by a surface of the housing, a plurality of rolling elements disposed between the inner ring and the outer ring, and at least one distance sensor configured to measure a distance between the shaft and the housing in order to detect wear of the rolling bearing.

17 Claims, 2 Drawing Sheets

(56) References Cited

U.S. PATENT DOCUMENTS

2021/0123479 A1* 4/2021 Landrieve ............... G01S 15/08
2021/0148408 A1   5/2021 Landrieve

FOREIGN PATENT DOCUMENTS

| | | |
|---|---|---|
| DE | 102016222886 A1 | 12/2017 |
| DE | 102019217789 A1 | 5/2021 |
| EP | 1528356 A2 * | 5/2005 ............ F16C 19/166 |
| EP | 1528356 A2 | 5/2005 |
| EP | 1879033 A2 | 1/2008 |
| EP | 3483581 A1 | 5/2019 |
| JP | H06330937 A | 11/1994 |
| JP | 2008014330 A | 1/2008 |
| WO | 2005023614 A2 | 3/2005 |
| WO | 2010070392 A1 | 6/2010 |

OTHER PUBLICATIONS

Preliminary Decision from the Austrian Patent Office dispatched Aug. 4, 2022 in related application No. A 50655/2021.
Preliminary Decision from the Austrian Patent Office dispatched Dec. 9, 2022 in related application No. A 50655/2021, and translation thereof.

* cited by examiner

ROLLING BEARING ASSEMBLY

CROSS-REFERENCE

This application claims priority to German patent application no. 10 2020 128 097.1 filed on Oct. 26, 2020, the contents of which are fully incorporated herein by reference.

TECHNOLOGICAL FIELD

The present invention is directed to a rolling bearing assembly equipped with a distance sensor.

BACKGROUND

Rolling bearings are often used, in mechanical systems for example, to support shafts in a housing. Since such rolling bearings wear during operation, it is necessary to monitor wear of the rolling bearing to determine when a repair or an exchange might be necessary. Such wear can be monitored via a sensor system that detects, for example, vibration, temperature, or acoustics of the rolling bearing and analyzes it. However, with slewing bearings, such as are used, for example, in converter plants, the bearings do not rotate through 360°, but rather only pivot through an angle of less than 360°. Measuring the wear via a vibration or acoustic measurement is therefore only imperfectly practicable, since such measurements require a complete rotation of the rolling bearing in order to provide reliable information.

SUMMARY

It is therefore an aspect of the present disclosure to make possible a reliable monitoring of a rolling bearing, even when the rolling bearing only performs a pivot movement.

The rolling bearing assembly can be a slewing bearing assembly, in particular a large rolling bearing assembly, such as is used, for example, to support a converter. Such converters are used inter alia in steelmaking or non-ferrous metal production.

The rolling bearing assembly includes a rolling bearing having an inner ring, an outer ring, and a plurality of rolling elements that are disposed between the inner ring and the outer ring. For example, the rolling bearing can be a double row tapered roller bearing. Other types of rolling bearings, such as, for example, ball bearings, are also possible. Here the inner ring can be supported on a shaft, or the shaft can form the inner ring. The outer ring can in turn be supported in a housing, or the housing can form the outer ring.

In order to now monitor and be able to detect wear of the rolling bearing, the rolling bearing assembly includes at least one distance sensor module, which is configured to measure a distance between the shaft and the housing. Wear of the rolling bearing, which is disposed between the shaft and the housing, or whose rings are formed by the shaft and/or the housing, causes the distance between the shaft and the housing to change. If the sensor is located above a horizontal shaft supporting the bearing, the distance will increase as the bearing wears. If the sensor is located below the horizontal shaft, the distance between the shaft and sensor will decrease as the bearing wears. This distance can be monitored by the distance sensor module, and wear of the rolling bearing can be detected by a change of the distance.

Compared to previous sensors that, for example, measure vibrations, a rolling bearing that is only used in a pivot movement can also be monitored by such a distance sensor module. Such a pivot movement causes wear of the bearing that is not to be able to be detected by a vibration sensor because vibration sensors require a complete rotation of the rolling bearing in order to detect vibrations.

However, if a distance sensor module is used as disclosed here, the wear of the rolling bearing can even be reliably detected when the rolling bearing only performs pivoting movements.

According to one embodiment, the distance sensor module is integrated in the housing or the outer ring. In particular, the housing or the outer ring can include a radially extending opening into which the distance sensor module is pushed from outside. This has the advantage that the distance sensor module can be exchanged or configured or adjusted from outside without great effort.

With previously used temperature or vibration sensors it was necessary to dismantle the rolling bearing assembly and open the housing to gain access to the sensors. This is not necessary with the present rolling bearing assembly because the distance sensor module can be pushed into the housing or the outer ring from outside. This also simplifies installation, since all other elements of the rolling bearing assembly can be installed first, and the distance sensor module can then be pushed into the housing only at the end of the assembly process.

Furthermore, the disclosed configuration allows for a simple exchange or configuration of the distance sensor module from outside without an additional part of the housing needing to be removed. It is also possible to retrofit existing rolling bearing assemblies with a distance sensor module, because only one through-opening in the housing is required to insert the distance sensor module into the rolling bearing assembly. Providing the distance sensor as a module, i.e., a module that contains all sensor elements, simplifies the handling and the installation of the distance sensor as compared to individual elements.

According to a further embodiment, the distance sensor module is disposed on a radial surface of the housing or of the outer ring adjacent to an axial end of the rolling bearing. The distance sensor module can be installed, for example, on an inner radial surface of the housing or of the outer ring.

The rolling bearing assembly can also include two or more distance sensor modules that are each disposed on an axial end of the rolling bearing. If two distance sensor modules are used, in addition to monitoring and detecting wear, a tilting of the shaft can also be detected. Since the two distance sensor modules are disposed on both axial ends of the rolling bearing, differing wear of the rolling bearing, which causes a tilting of the shaft, can thus be detected. The distances that are captured by the two distance sensor modules are different and indicate a tilting of the shaft.

According to a further embodiment, the distance sensor module includes a plurality of sensor elements and is disposed such that at least one sensor element is disposed adjacent to the shaft. The distance sensor module preferably extends from the housing or the outer ring toward the shaft. A sensor element can advantageously be disposed adjacent to the shaft, while the distance sensor module is simultaneously pushed into the housing or the outer ring from outside. Due to a small distance between the shaft and the sensor element, a good recording and detection of the distance between shaft and housing is possible since the sensor element itself has only a small distance to the shaft, whereby the sensitivity is increased.

In order to allow the sensor element to be arranged adjacent to the shaft, the distance sensor module can include a tubular, radially extending receptacle extending toward the shaft for housing the sensor elements. The tubular receptacle is preferably pushed into an opening of the housing or of the outer ring. In this context a "tubular receptacle" can be understood to mean a round tubular receptacle, but also an angular tubular receptacle, for example, in a quadrangular shape.

The tubular receptacle can be attached to the housing or the outer ring. For example, the tubular receptacle can extend through the housing or the housing and the outer ring. The tubular receptacle can receive all sensor elements of the distance sensor module in itself so that a positioning of the sensor adjacent to the shaft is possible and, for example, a cable connection in the tubular receptacle can be guided outward.

According to a further embodiment, the distance sensor module includes a connecting element for connecting to an evaluation unit. The connecting element can be, for example, a plug, via which a connection to an external evaluation unit is possible. The connecting element can be connected, for example, via a cable to the sensor. The outer element is preferably located outside the housing so that a simple connection to an evaluation unit is possible.

The distance sensor module can include an adjusting device for changing the distance between the distance sensor module and the shaft. Such an adjusting device allows the same distance sensor module to be used for different rolling bearing assemblies, since it can be adapted to the specific distances and dimensions of the rolling bearing assembly using the adjusting device. The adjusting device can be, for example, an adjusting screw or the like that can change the distance between the distance sensor module and the shaft.

The distance sensor module can be attached to the housing or the outer ring by attachment means. Such attachment means can include screw connections. In one embodiment, the adjusting device can also simultaneously serve as attachment means.

The distance sensor module preferably includes a sensor, in particular a proximity switch, eddy current sensor (eddy probe), or a path sensor. The distance sensor module can include any sensors that are able to monitor a distance between the housing and the shaft and to detect a change. A proximity switch can be implemented, for example, as an inductive or capacitive proximity switch. Alternatively the sensor can also be an optical proximity switch. In any case such a proximity switch or proximity sensor reacts to an approach of the sensor to the shaft, as is the case, for example, when the shaft tilts due to wear of the rolling bearing. If the distance between the housing and the shaft, and thus the distance between the sensor and the shaft, is smaller, such a proximity switch emits a corresponding signal.

Alternatively the sensor can be a path sensor, for example, an inductive sensor, capacitive sensor, laser rangefinder, ultrasonic sensor, or the like. Such a path sensor also measures the distance between the housing or the sensor and the shaft.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
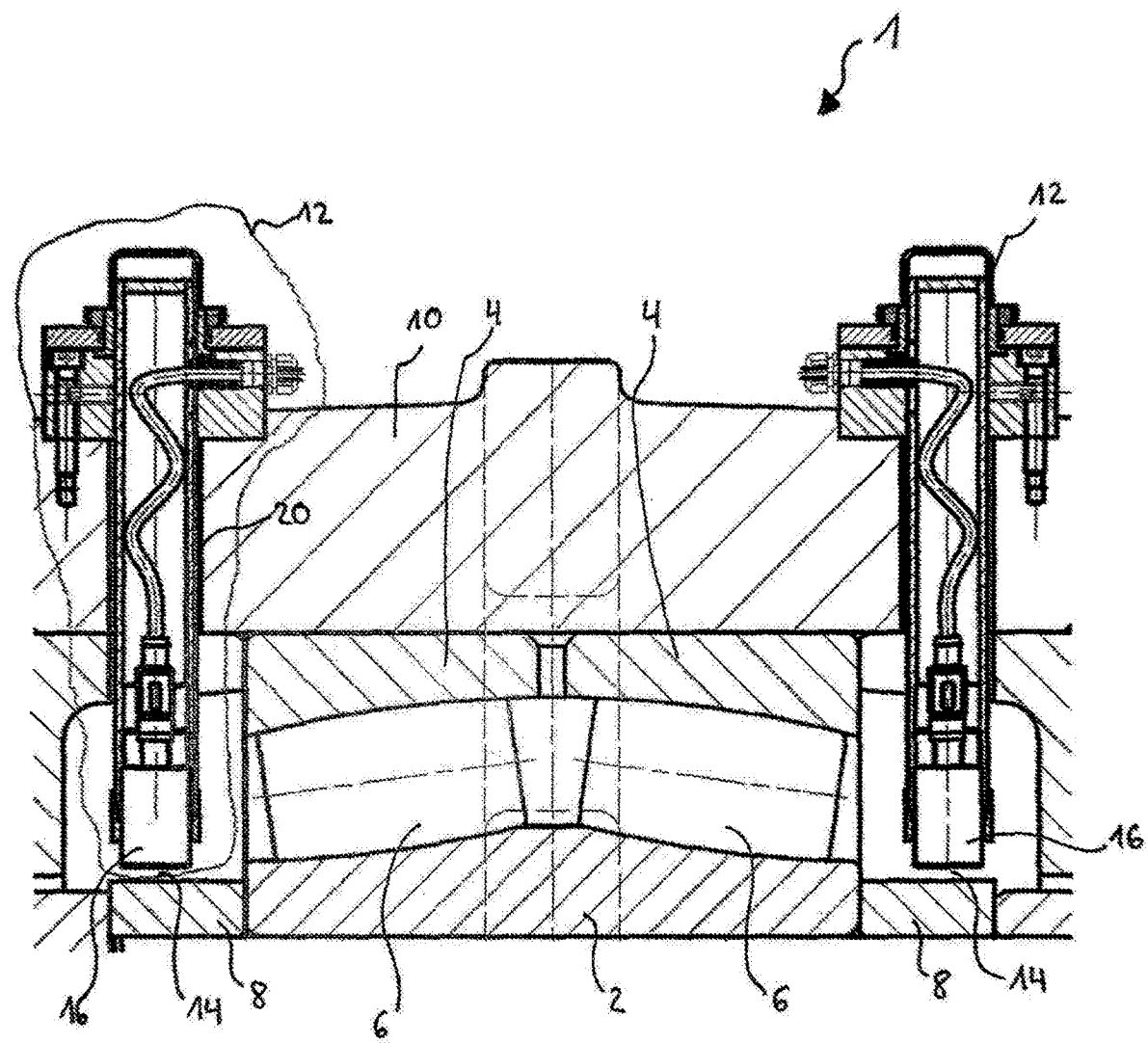
FIG. 1 is a sectional view of a rolling bearing assembly including a distance sensor module according to an embodiment of the present disclosure.

FIG. 1 shows a rolling bearing assembly 1, for example, a pivot bearing, in particular a large rolling bearing assembly. The rolling bearing assembly 1 includes a rolling bearing including an inner ring 2 and an outer ring 4, in this case a two-split outer ring 4. Rolling elements 6, which in this case are tapered rollers, are disposed between the inner ring 2 and the outer ring 4. Other types of rolling bearings, such as, for example, ball bearings, can also be used with the disclosed sensors.

Here the inner ring 2 is supported on a shaft 8. Alternatively the shaft 8 can form the inner ring 2. The outer ring 4 is supported in a housing 10. Alternatively the housing 10 can form the outer ring 4. In order to detect wear of the rolling bearing, the rolling bearing assembly 1 includes one or more distance sensor modules 12, in this case two distance sensor modules 12.

The distance sensor module 12 is configured to monitor a distance between the housing 10 and the shaft 8. Over the operating life of the rolling bearing assembly 1, the rolling bearing wears and causes the distance between the housing 10 and the shaft 8 to increase. By monitoring the distance between the housing 10 and the shaft 8, wear of the rolling bearing can thus be detected, and an exchange or a repair of the rolling bearing can be effected in a timely manner.

In the embodiment shown here, the distance sensor module 12 is integrated into the housing 10. Alternatively the distance sensor module 12 can also be integrated in the outer ring 4. The distance sensor module 12 includes a sensor 16 that serves to measure a distance 14 between the sensor 16 and the shaft 8. This distance 14 is representative of the distance between the housing 10 and the shaft 8, since with wear of the rolling bearing, the distance between the shaft 8 and the housing 10 changes, and thus the sensor 16 moves toward the shaft 8 or moves away from it. The sensor 16 can be a proximity switch or path sensor that is suitable for measuring a distance 14 to the shaft 8.

If two distance sensor modules 12 are used, as is shown in FIG. 1, in addition to measuring a distance between the housing 10 and the shaft 8, a tilting of the shaft 8 can also be detected. Since the wear of the rolling bearing can be different over the length of the rolling bearing, a tilting of the shaft 8 can result. Such a tilting of the shaft 8 can be recognized by changes in the different distances 14 that are detected by the distance sensor modules 12.

Figure 2:
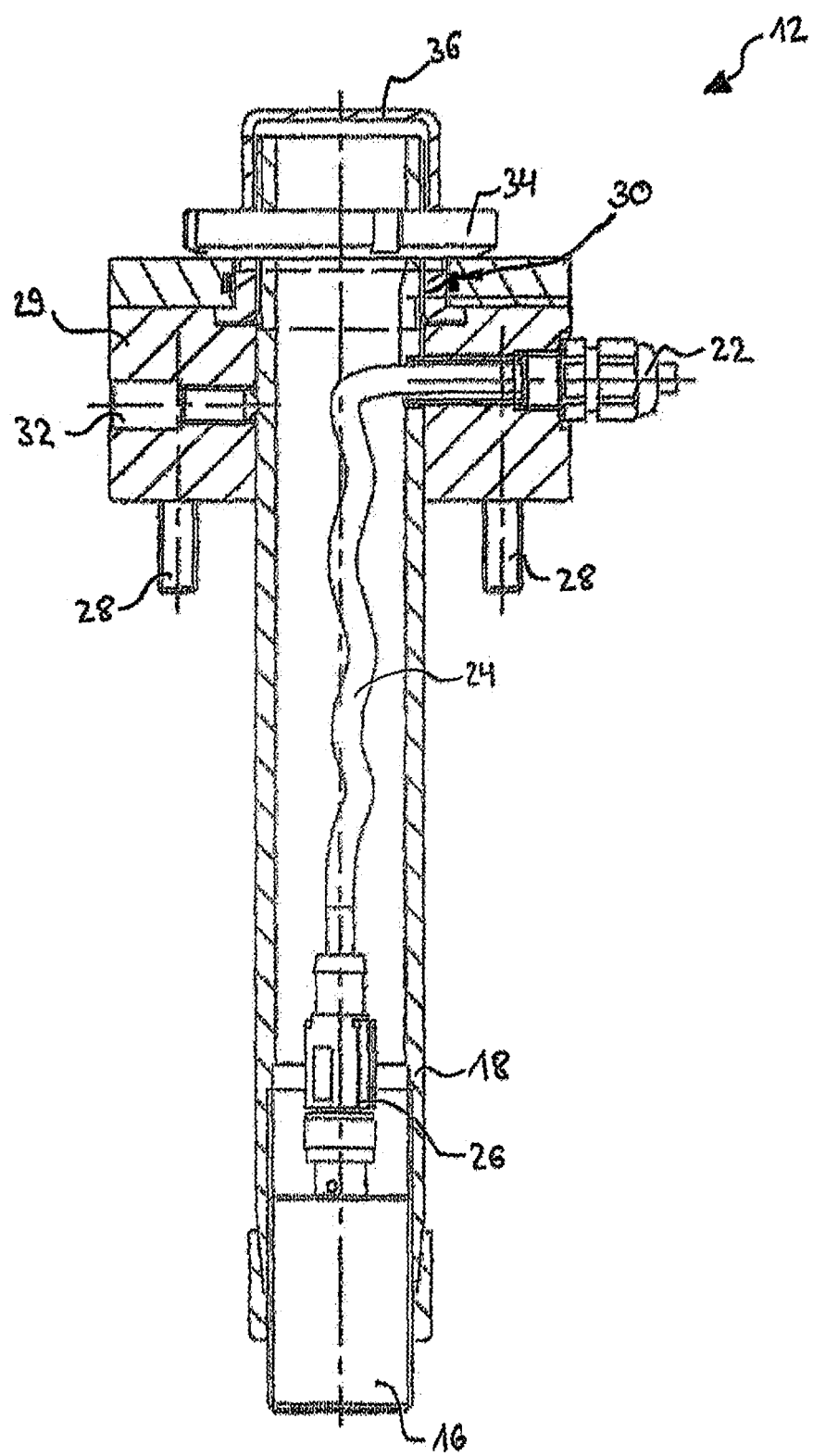
FIG. 2 is an enlarged partial sectional view of one of the distance sensor modules of FIG. 1.

The distance sensor module 12, which is shown in FIG. 2 in an enlarged view, includes a tubular receptacle 18 into which the sensor 16 is received. The tubular receptacle 18 can be pushed into a through-opening 20 of the housing 10. The distance sensor module 12 including the tubular receptacle 18 is preferably pushed into the housing 10 from outside. In this way a simple installation of the distance sensor module 12 from the outside is possible without the rolling bearing assembly 1 having to be dismantled for this purpose. Furthermore, the rolling bearing 1 can already be fully installed, and the distance sensor module 12 can be pushed in and attached last.

The distance sensor module 12 includes a connecting element 22, for example, a plug, that is accessible from the outside. The connecting element 22 can be connected to an external evaluation unit (not shown) in order to process information from the sensor 16. The connecting element 22 is connected via a cable 24 to the sensor 16, for example, via a connecting element 26. Alternatively such a connection can also be effected wirelessly. The cable 24 and all other sensor elements are disposed in the tubular receptacle 18, so that they can on the one hand be installed as a single module, and on the other hand are protected in the tubular receptacle 18.

The distance sensor module 12 can be connected via attachment means 28 to the housing 10. These attachment elements 28 can simultaneously serve as an adjusting device in order to carry out an adapting of the distance 14 between the distance sensor module 12, or the sensor 16, and the shaft 8.

In particular, these attachment means 28 can be disposed in an attachment housing 29 that surrounds the receptacle 18. A thread 30 is provided between the attachment housing 29 and the receptacle 18. In order to adjust the distance 14 between the sensor 16 and the shaft 8, an adjusting device 36 of the distance sensor module 12 can be rotated in the thread 30, and the receptacle 18 including the sensor 16 can be moved closer to the shaft 8 or moved away from it. After the adjusting, the receptacle 18 can be fixed by a fixing device 34 and additionally clamped by clamping elements 32.

In this way the same distance sensor module 12 can be used in different rolling bearing assemblies 1 since it can be adapted to the specific dimensions of a given rolling bearing assembly.

Due to the rolling bearing assembly disclosed here including the distance sensor module, it is possible in a simple manner to detect wear of a rolling bearing, wherein the distance between a housing and a shaft is monitored. Wear of the rolling bearing can thus be reliably detected, even when only a pivot movement of the rolling bearing is present.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved roller bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling bearing assembly
2 Inner ring
3 Outer ring
6 Rolling element
8 Shaft
10 Housing
12 Distance sensor module
14 Distance
16 Sensor
18 Tubular receptacle
20 Through-opening
22 Connecting element
24 Cable
26 Connecting element
28 Attachment means
29 Attachment housing
30 Thread
32 Clamping element
34 Fixing device
36 Adjusting device

What is claimed is:

1. A rolling bearing assembly comprising:
an inner ring supported by a shaft or formed by a surface of the shaft,
an outer ring supported in a housing or formed by a surface of the housing,
a plurality of rolling elements disposed between the inner ring and the outer ring, and
at least one distance sensor configured to measure a distance between the shaft and the housing in order to detect wear of the rolling bearing,
wherein the distance sensor is a component of a distance sensor module integrated in the housing or the outer ring, and
wherein the distance sensor module includes adjusting means for adjusting the distance between the distance sensor module and the shaft.

2. The rolling bearing assembly according to claim 1, wherein the distance sensor module is disposed on a radial surface of the housing or on a radial surface of the outer ring adjacent to an axial end of the rolling bearing.

3. The rolling bearing assembly according to claim 1, wherein the housing or the outer ring includes a radially extending opening into which the distance sensor module is insertable from the outside.

4. The rolling bearing assembly according to claim 3, wherein the at least one distance sensor comprises a first distance sensor and a second distance sensor extending from the housing or from the outer ring toward the shaft so that a surface of the first distance sensor and/or the second distance sensor faces the shaft.

5. The rolling bearing assembly according to claim 1, wherein the distance sensor comprises a proximity switch or a path sensor.

6. The rolling bearing assembly according to claim 1, wherein the rolling bearing assembly is a pivot bearing.

7. A rolling bearing assembly comprising:
an inner ring supported by a shaft or formed by a surface of the shaft,
an outer ring supported in a housing or formed by a surface of the housing,
a plurality of rolling elements disposed between the inner ring and the outer ring, and
a first distance sensor module including a first distance sensor configured to measure a first distance between the shaft and the housing and a second distance sensor module including a second distance sensor configured to measure a second distance between the shaft and the housing in order to detect wear of the rolling bearing,
wherein each of the first and second distance sensor modules extends from the housing or from the outer ring toward the shaft so that a surface of the first and a surface of the second distance sensor face the shaft,
wherein the first distance sensor module includes a first tubular, radially extending receptacle and the second distance sensor module includes a second tubular, radially extending receptacle,
wherein at least a portion of the first distance sensor is located in the first receptacle and at least a portion of the second distance sensor is located in the second receptacle,
wherein each of the tubular receptacles extends toward the shaft, and
wherein each of the tubular receptacles is attached to the housing or to the outer ring.

8. The rolling bearing assembly according to claim 7, wherein the tubular receptacle is configured to be pushed into an opening of the housing or the outer ring.

9. The rolling bearing assembly according to claim 7,
wherein the housing or the outer ring includes a radially extending opening into which the distance sensor module is insertable from the outside.

10. The rolling bearing assembly according to claim 7,
including attachment means for attaching the distance sensor module to the housing or to the outer ring.

11. The rolling bearing assembly according to claim 7,
wherein the second distance sensor is axially spaced from the first distance sensor.

12. The rolling bearing assembly according to claim 11,
wherein the second distance sensor is circumferentially aligned with the first distance sensor.

13. The rolling bearing assembly according to claim 7,
including adjusting means for adjusting a distance between the first distance sensor and the shaft.

14. A method of detecting wear and/or tilting of a rolling bearing assembly that includes an inner ring supported by a shaft or formed by a surface of the shaft, an outer ring supported in a housing or formed by a surface of the housing, and a plurality of rolling elements disposed between the inner ring and the outer ring, the method comprising:
using a first distance sensor to measure a first distance between the shaft and the housing and a second distance sensor axially spaced from the first distance sensor to measure a second distance between the shaft and the housing,
indicating a wear of the rolling bearing assembly if the first distance and/or the second distance is greater than a predetermined amount, and/or
indicating a tilting of the shaft based on a difference between the first distance and the second distance being greater than a second predetermined amount.

15. The method according to claim 14, including producing an output signal indicative of the first distance and the second distance.

16. The method according to claim 14,
wherein indicating the wear and/or the tilting comprises indicating the tilting.

17. The method according to claim 14, wherein indicating the wear and/or the tilting comprises indicating the wear and indicating the tilting.

\* \* \* \* \*